(12) United States Patent
Despotopoulou et al.

(10) Patent No.: US 12,060,459 B2
(45) Date of Patent: Aug. 13, 2024

(54) PROCESS FOR THE PREPARATION OF POLYORGANOSILOXANES

(71) Applicant: Henkel AG & Co. KGaA, Duesseldorf (DE)

(72) Inventors: Christina Despotopoulou, Minneapolis, MN (US); Johann Klein, Duesseldorf (DE); Therese Hemery, Wiesbaden (DE); Esteban Mejia, Rostock (DE); Udo Kragl, Kritzmow (DE); Theresia Koehler, Rostock (DE); Lea Grefe, Rostock (DE)

(73) Assignee: Henkel AG & Co. KGaA, Duesseldorf (DE)

( * ) Notice: Subject to any disclaimer, the term of this patent is extended or adjusted under 35 U.S.C. 154(b) by 682 days.

(21) Appl. No.: 17/158,149

(22) Filed: Jan. 26, 2021

(65) Prior Publication Data

US 2021/0147632 A1 May 20, 2021

Related U.S. Application Data

(63) Continuation of application No. PCT/EP2019/068977, filed on Jul. 15, 2019.

(30) Foreign Application Priority Data

Jul. 27, 2018 (EP) .................................... 18185931

(51) Int. Cl.
| | |
|---|---|
| *C08G 77/08* | (2006.01) |
| *C08G 77/00* | (2006.01) |
| *C08G 77/06* | (2006.01) |
| *C08G 77/12* | (2006.01) |
| *C08G 77/16* | (2006.01) |
| *C08G 77/20* | (2006.01) |
| *C08K 5/05* | (2006.01) |
| *C08K 5/18* | (2006.01) |
| *C08K 5/23* | (2006.01) |

(52) U.S. Cl.
CPC ............. *C08G 77/08* (2013.01); *C08G 77/06* (2013.01); *C08G 77/12* (2013.01); *C08G 77/16* (2013.01); *C08G 77/20* (2013.01); *C08G 77/70* (2013.01); *C08G 77/80* (2013.01); *C08K 5/05* (2013.01); *C08K 5/18* (2013.01); *C08K 5/23* (2013.01); *C08G 2170/00* (2013.01)

(58) Field of Classification Search
CPC ....................................................... C08G 77/08
USPC ............................................... 528/20, 21, 23
See application file for complete search history.

(56) References Cited

U.S. PATENT DOCUMENTS

| | | | |
|---|---|---|---|
| 6,054,548 A | 4/2000 | Currie et al. | |
| 2003/0229193 A1* | 12/2003 | Stepp ..................... | C08G 77/08 528/10 |
| 2008/0306236 A1 | 12/2008 | Fleury et al. | |
| 2016/0215097 A1 | 7/2016 | Sivasubramanian et al. | |

FOREIGN PATENT DOCUMENTS

| | | |
|---|---|---|
| EP | 1008611 A2 | 6/2000 |
| JP | 2003252996 A | 9/2003 |
| JP | 2017190305 A | 10/2017 |
| WO | 2015031085 A1 | 3/2015 |

OTHER PUBLICATIONS

Machine translation of CN 109280170 (Jan. 2019).*
International Search Report for International PCT Patent Application No. PCT/EP2019/068977 dated Aug. 20, 2019.

* cited by examiner

Primary Examiner — Marc S Zimmer
(74) Attorney, Agent, or Firm — James E. Piotrowski

(57) ABSTRACT

The invention relates to a process for preparing polyorganosiloxanes by (i) condensation polymerization of at least one linear organosiloxane which has at least one hydroxy group or hydrolysable group bound to a silicon atom, (ii) ring-opening polymerization of at least one cyclosiloxane, or (iii) ring-opening polymerization and condensation polymerization of a mixture of at least one linear organosiloxane which has at least one hydroxy group or hydrolysable group bound to a silicon atom and at least one cyclosiloxane with a basic initiator and a hydroxy group-containing compound in the presence of a polar aprotic solvent, wherein the obtained polyorganosiloxanes are not miscible in the polar aprotic solvent at room temperature.

15 Claims, No Drawings

PROCESS FOR THE PREPARATION OF POLYORGANOSILOXANES

The present invention relates to a process for preparing polyorganosiloxanes by condensation polymerization and/or ring-opening polymerization of hydroxy-terminated polyorganosiloxanes and/or cyclosiloxanes with a basic initiator and a hydroxy group-containing compound in the presence of a polar aprotic solvent.

Silicones are widely used in many different applications such as in adhesives and sealants. Most of them are made from polymerized siloxanes or cross-linked derivatives thereof. Such silicones may be part of formulations which comprise at least one polyorganosiloxane and a crosslinker. These systems can be cross-linked via radical reactions with peroxides, hydrosilylation, or condensation, among others. Moisture curable silicones (via condensation cross-linking), have been known for a long time. Such formulations may comprise at least one condensation cross-linkable hydroxy- or alkoxy-terminated polyorganosiloxane, at least one siloxane cross-linker such as trialkoxyorganosilanes and fillers.

The ring-opening polymerization is a very important process for obtaining polyorganosiloxanes in a controlled way. Furthermore, this is also the main pathway in industry to obtain silicones with controlled molecular weight. The ring-opening polymerization of cyclic organosiloxanes is used to prepare functionalized oils, gums or resins. Those functionalities are mainly hydrogen, methyl, cyclohexyl, cyclopentyl or phenyl groups. The cyclic monomers used are mainly organocyclotetrasiloxane or organocyclotrisiloxane. The polymerization can be carried out under anionic conditions using basic initiators or under cationic conditions using acidic conditions.

The anionic route is more often used for the synthesis of high molecular weight polymers. Many different initiators are well known for this purpose. Commonly described are alkali metal or earth alkali metal hydroxides (e.g. KOH, NaOH), alcoholic complexes thereof, alkali metal or earth alkali metal silanolates, tetraammonium hydroxide and phosphazene bases. The general polymerization mechanism for the anionic ring-opening polymerization is known in Penczek, Stanislaw; Prog. Polym. Sci.; 2007; 32; 254.

Such polymerization reactions can be carried out in the absence or presence of solvent or in emulsion. The solubility of the initiator in the reaction medium is important regarding the kinetics. U.S. Pat. No. 6,054,548 describes that suitable solvents are liquid hydrocarbons such as hexane or silicone fluids. US 2008/0306236 A1 discloses various additives and co-initiators such as complexing agents which shall improve the polymerization rate.

In general, producing a silicone polymer comprises three essential steps (i) producing an unstripped silicone polymer by condensation polymerization or ring-opening polymerization, (ii) neutralizing the catalyst, (iii) stripping the silicone polymer. Commonly, a neutralizing agent is used to quench the reaction by neutralizing the basic initiator. Solid catalyst residues which may remain in the polymeric product may be removed by different means, such as by filtration.

U.S. Pat. No. 6,054,548 discloses a process for producing a silicone polymer by polymerization of a linear silanol group containing siloxane by condensation polymerization or of a cyclosiloxane by ring-opening polymerization, or of a mixture of said linear and cyclosiloxanes with a phosphazene base in the presence of water. It describes that end-blocking agents such as diorganotetramethydisiloxanes may be used to regulate the molecular weight of the polymer and/or to add an end-functionality e.g., vinyl groups.

Bicyclic guanidines are known to be active initiators for various cyclic monomers such as cyclic esters (Kamber, Nahrain; Organocatalytic Ring-opening Polymerization; Chem. Rev. March 2007, 2007, Vol 10, page 5835 and 5836), (Penczek, Stanislaw; Prog. Polym. Sci.; 2007; 32; 261), (Pratt, Russell C.; J. Am. Chem. Soc.; 2006; 128; 4556) or cyclic carbosiloxanes (Lohmeijer, Bas G. G.; Org. Lett.; 2006; 8; No. 21, page 5833-5836). US 2016/0215097 A1 also discloses a process for the ring opening polymerization of a cyclosiloxane in the presence of a bicyclic guanidine compound.

A need still exists in the art for a process for the preparation of polyorganosiloxanes with high conversions and in an economic way.

It has been found that the preparation of polyorganosiloxanes by condensation polymerization and/or ring-opening polymerization of linear organosiloxanes at least one hydroxy group or hydrolysable group bound to a silicon atom and/or cyclosiloxanes with basic initiator and a hydroxy group-containing as a co-initiator in the presence of a polar aprotic solvent which is not miscible with the produced polyorganosiloxane leads to a high conversion and avoids the necessity of quenching the reaction by deactivation of the initiators. In addition, it allows recycling the initiator and the solvent for a subsequent polymerization.

In accordance with the invention there is provided a process for polyorganosiloxanes by (i) condensation polymerization of at least one organosiloxane which has at least one hydroxy group or hydrolysable group bound to a silicon atom, (ii) ring-opening polymerization of at least one cyclosiloxane, or (iii) ring-opening polymerization and condensation polymerization of a mixture of at least one linear organosiloxane which has at least one hydroxy group or hydrolysable group bound to a silicon atom and at least one cyclosiloxane with a base initiator and a hydroxy group-containing compound in the presence of a polar aprotic solvent, wherein the obtained polyorganosiloxanes are not miscible in the polar aprotic solvent at room temperature.

As used herein, the singular forms "a", "an" and "the" include plural referents unless the context clearly dictates otherwise.

The terms "comprising", "comprises" and "comprised of" as used herein are synonymous with "including", "includes", "containing" or "contains", and are inclusive or open-ended and do not exclude additional, non-recited members, elements or method steps.

When amounts, concentrations, dimensions and other parameters are expressed in the form of a range, a preferable range, an upper limit value, a lower limit value or preferable upper and limit values, it should be understood that any ranges obtainable by combining any upper limit or preferable value with any lower limit or preferable value are also specifically disclosed, irrespective of whether the obtained ranges are clearly mentioned in the context.

The words "preferred" and "preferably" are used frequently herein to refer to embodiments of the disclosure that may afford particular benefits, under certain circumstances. However, the recitation of one or more preferable or preferred embodiments does not imply that other embodiments are not useful and is not intended to exclude those other embodiments from the scope of the disclosure.

As used herein, room temperature is 23° C. plus or minus 2° C.

Provided reference is made to molecular weights of oligomers or polymers in the present application, the quantities, unless otherwise stated, refer to the number average, i.e., the $M_n$ value, and not to the weight average molecular weight. The molecular weight is determined by gel permeation chromatography (GPC) at 30° C. For the separation a combination of three different columns was used: Styragel HR 4 (300×7.8 mm), Styragel HR 3 (300×7.8 mm), precolumn Styragel (30 mm) obtained from Waters. As a detector a light scattering detector is used. As eluent toluene is used with a flow rate of 1 mL/min. As standard PDMS is used. Molecular weights of monomeric compounds are calculated based on the respective molecular formula and the known molecular weights of the individual atoms.

"At least one," as used herein, refers to 1 or more, i.e., 1, 2, 3, 4, 5, 6, 7, 8, 9, or more. In regard to an ingredient, the term relates to the type of ingredient and not to the absolute number of molecules. "At least one polymer" thus means, for example, at least one type of polymer, i.e., that a type of polymer or a mixture of a number of different polymers can be used. Together with weight data, the term refers to all compounds of the given type, contained in the composition/mixture, i.e., that the composition contains no other compounds of this type beyond the given amount of the relevant compounds.

All percentage data, provided in connection with the compositions described herein, refer to % by weight, based in each case on the relevant mixture, unless explicitly indicated otherwise.

As used herein, "telechelic" polymer refers to a polymer capable of entering into further polymerization or other reactions through its reactive end-groups.

As used herein, "polar aprotic solvent" refers to a polar solvent that does not contain acidic hydrogen which is bound to either nitrogen or oxygen.

A "polyol" is understood for purpose of the present invention as a polymer having at least two hydroxy groups.

As used herein, "$C_1$-$C_{10}$ alkyl" group refers to a monovalent group that contains 1 to 10 carbons atoms, that is a radical of an alkane and includes straight-chain and branched organic groups. Examples of alkyl groups include, but are not limited to: methyl; ethyl; propyl; isopropyl; n-butyl; isobutyl; sec-butyl; tert-butyl; n-pentyl; n-hexyl; n-heptyl; and, 2-ethylhexyl. In the present invention, such alkyl groups may be unsubstituted or may be substituted with one or more substituents such as halo, nitro, cyano, amido, amino, sulfonyl, sulfinyl, sulfanyl, sulfoxy, urea, thiourea, sulfamoyl, sulfamide and hydroxy. The halogenated derivatives of the exemplary hydrocarbon radicals listed above might, in particular, be mentioned as examples of suitable substituted alkyl groups. In general, however, a preference for unsubstituted alkyl groups containing from 1-6 carbon atoms ($C_1$-$C_6$ alkyl)—for example unsubstituted alkyl groups containing from 1 to 4 carbon atoms ($C_1$-$C_4$ alkyl)—should be noted.

The term "$C_3$-$C_{10}$ cycloalkyl" is understood to mean a saturated, mono- or poly, e.g., bi- or tricyclic hydrocarbon group having from 3 to 10 carbon atoms, particularly 3 to 8 carbon atoms, in which the ring does not have a completely conjugated pi-electron system. Examples of cycloalkyl groups include: cyclopropyl; cyclobutyl; cyclopentyl; cyclohexyl; cycloheptyl; cyclooctyl; cyclobutenyl; cyclopentenyl; cyclohexenyl; adamantane; and, norbornane. Cycloalkyl groups can be substituted or unsubstituted. "Substituted," as used in this regard, means that one or more hydrogen atoms of the cycloalkyl group are replaced with one or more substituents such as halo, nitro, cyano, amido, amino, sulfonyl, sulfinyl, sulfanyl, sulfoxy, urea, thiourea, sulfamoyl, sulfamide and hydroxy.

As used herein, an "$C_6$-$C_{18}$ aryl" group used alone or as part of a larger moiety—as in "aralkyl group"—refers to optionally substituted, monocyclic or polycyclic, e.g., bicyclic and tricyclic, ring systems in which the monocyclic ring system is aromatic or at least one of the rings in a bicyclic or tricyclic ring system is aromatic. The bicyclic and tricyclic ring systems include benzofused 2-3 membered carbocyclic rings. Exemplary aryl groups include: phenyl; indenyl; naphthalenyl, tetrahydronaphthyl, tetrahydroindenyl; tetrahydroanthracenyl; and, anthracenyl. And a preference for phenyl groups may be noted. Aryl groups can be substituted or unsubstituted. If they are substituted, the substituents are as defined above for cycloalkyl. "Aryloxy" refers to an aryl group, as defined herein, that is linked via an —O— to the rest of the molecule.

As used herein, an "aralkyl" group refers to an alkyl group that is substituted with an aryl group. An example of an aralkyl group is benzyl.

As used herein, an "alkaryl" group refers to an aryl group that is substituted with an alkyl group. An example of an alkaryl group is ethyl-phenyl.

Where mentioned, the expression "interrupted by at least one heteroatom" means that the main chain of a residue comprises, as a chain member, at least one atom that differs from carbon atom. Particularly the term "heteroatom" refers to nitrogen, oxygen, halogens, phosphorus, sulfur, or silicon, more preferably nitrogen, oxygen, sulfur or silicon. In most preferred embodiments, oxygen (O) and nitrogen (N) may be mentioned as typical heteroatoms in the context of the present invention.

As used herein, the term "ring-opening polymerization" denotes a polymerization in which a cyclic compound (monomer) is opened to form a linear polymer. Reference in this context may be made to inter alia in: i) Duda, A. et al. *Thermodynamics and Kinetics of Ring-Opening Polymerization in Handbook of Ring-Opening Polymerization*, Wiley-VCH, Weinheim, Germany, (2009) page 8; ii) Choijnowski, J. et al. *Kinetically controlled ring-opening polymerization*, J. Inorg. Organomet. Polym. (1991) 1, pages 299-323; and, iii) Nuyken et al. *Ring-Opening Polymerization—An Introductory Review* Polymers 2013, 5, 361-403.

The present invention provides a process for preparing polyorganosiloxanes by (i) condensation polymerization of at least one linear organosiloxane which has at least one hydroxy group or hydrolysable group bound to a silicon atom, (ii) ring-opening polymerization of at least one cyclosiloxane or (iii) ring-opening polymerization and condensation polymerization of a mixture of at least one linear organosiloxane which has at least one hydroxy group or hydrolysable group bound to a silicon atom and at least one cyclosiloxane with a basic initiator and a hydroxy group-containing compound in the presence of a polar aprotic solvent, wherein the obtained polyorganosiloxanes are not miscible in the polar aprotic solvent at room temperature.

According to certain embodiments of the present invention, the polyorganosiloxanes produced according to the present invention can be homotelechelic or heterotelechelic.

According to preferred embodiments of the present invention, the obtained polyorganosiloxanes have the general Formula (I)

wherein

R¹ and R⁴ are the same or different and independently selected from the group consisting of hydrogen, a triorganosilyl group, and a substituted or unsubstituted hydrocarbon group having 1 to 22 carbon atoms, optionally interrupted by at least one heteroatom;

R² and R³ are the same or different and independently selected from a hydrocarbon group having 1 to 18 carbon atoms, optionally interrupted by at least one heteroatom; and n denotes an integer of at least 3, preferably 3 to 50,000, more preferably 15 to 10,000, most preferably 30 to 5000.

In various embodiments, R¹ and R⁴ are the same or different and independently selected from the group consisting of hydrogen, a triorganosilyl group, and a substituted or unsubstituted $C_1$-$C_{12}$ alkyl group, $C_1$-$C_{12}$ alkenyl group, $C_3$-$C_{10}$ cycloalkyl, $C_6$-$C_{18}$ aralkyl group, and $C_6$-$C_{18}$ aryl group, optionally interrupted by at least one heteroatom, preferably O, N, S and/or Si. More preferably R¹ and R⁴ are the same or different and independently selected from hydrogen, a substituted or unsubstituted $C_1$-$C_8$ alkyl group, in particular methyl, ethyl, n-propyl, fluoropropyl, n-butyl, sec-butyl, or tert-butyl, a substituted or unsubstituted $C_1$-$C_8$ alkenyl group, in particular vinyl, allyl, propenyl, or butenyl, or a substituted or unsubstituted $C_6$-$C_{18}$ aryl group, in particular phenyl, tolyl or benzoyl.

In preferred embodiments, R¹ is methyl and R⁴ is methyl or hydrogen, in particular methyl.

In various embodiments, R² and R³ are the same or different and independently selected from the group consisting of a substituted or unsubstituted $C_1$-$C_{12}$ alkyl group, $C_1$-$C_{12}$ alkenyl group, $C_3$-$C_{10}$ cycloalkyl, $C_6$-$C_{18}$ aralkyl group, $C_6$-$C_{18}$ aryl group, and $C_6$-$C_{18}$ alkaryl group, optionally interrupted by at least one heteroatom, preferably O, N, S and/or Si. More preferably, R² and R³ are the same or different and independently selected from a substituted or unsubstituted $C_1$-$C_8$ alkyl group, in particular methyl, ethyl, n-propyl, fluoropropyl, n-butyl, sec-butyl, or tert-butyl, $C_1$-$C_8$ alkenyl group, in particular vinyl, allyl, propenyl, or butenyl, $C_6$-$C_{18}$ aralkyl group, $C_6$-$C_{18}$ aryl group and $C_6$-$C_{18}$ alkaryl group, in particular phenyl, tolyl or benzoyl.

In preferred embodiments, R² and R³ are the same or different and independently selected from methyl or phenyl.

Suitable starting materials for the ring-opening polymerization according to the present invention are cyclosiloxanes. In preferred embodiments, the cyclosiloxanes have the general Formula (II)

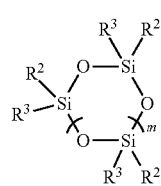

(II)

wherein

R² and R³ are the same or different and independently selected from a hydrocarbon group having 1 to 18 carbon atoms, optionally interrupted by at least one heteroatom; and m denotes an integer in the range of from 1 to 10, preferably 1 to 6, more preferably 2 or 3.

In various embodiments, R² and R³ are the same or different and independently selected from the group consisting of a substituted or unsubstituted $C_1$-$C_{12}$ alkyl group, $C_1$-$C_{12}$ alkenyl group, $C_3$-$C_{10}$ cycloalkyl, $C_6$-$C_{18}$ aralkyl group, $C_6$-$C_{18}$ aryl group, and $C_6$-$C_{18}$ alkaryl group, optionally interrupted by at least one heteroatom, preferably O, N, S and/or Si. More preferably, R² and R³ are the same or different and independently selected from a substituted or unsubstituted $C_1$-$C_8$ alkyl group, in particular methyl, ethyl, n-propyl, fluoropropyl, n-butyl, sec-butyl, or tert-butyl, $C_1$-$C_8$ alkenyl group, in particular vinyl, allyl, propenyl, or butenyl, $C_6$-$C_{18}$ aralkyl group, $C_6$-$C_{18}$ aryl group and $C_6$-$C_{18}$ alkaryl group, in particular phenyl, tolyl or benzoyl.

In preferred embodiments, R² and R³ are the same or different and independently selected from methyl or phenyl.

The starting material for the ring-opening polymerization may comprise a mixture of two or more cyclosiloxanes. In some embodiments, the mixture may comprise two or more cyclosiloxanes of different ring sizes.

In various embodiments, at least one of the cyclosiloxanes comprises one or more functional groups selected from vinyl, amine, alcohol, or nitro. Preferably at least 50% of all R groups, i.e., R² and R³, are methyl or phenyl groups, more preferable methyl groups. It is most preferred that substantially all R groups are methyl groups.

Preferably m is selected from an integer in the range of from 1 to 6, more preferably 2 or 3.

Examples of suitable cyclosiloxanes of the general Formula (II) include, but are not limited to, hexamethylcyclotrisiloxane (D3), octamethylcyclotetrasiloxane (D4), octaphenylcyclotetrasiloxane, tetramethylcyclotetrasiloxane, hexamethyl-1,1-diphenylcyclotetrasiloxane, decamethylcyclopentasiloxane, tetramethyltetravinylcyclotetrasiloxane, cyclopenta(methylvinyl) siloxane and cyclotetra(phenylmethyl)siloxane, and mixtures thereof. More preferably, hexamethylcyclotrisiloxane, octamethylcyclotetrasiloxane, decamethylcyclopentasiloxane, tetramethyltetravinylcyclotetrasiloxane, cyclopenta(methylvinyl)siloxane and cyclotetra(phenylmethyl)siloxane can be used. Particularly suitable cyclosiloxanes are octamethylcyclotetrasiloxane, hexamethylcyclotrisiloxane, or mixtures thereof.

Suitable starting materials for the condensation reaction according to the present invention are linear organosiloxanes having at least one silicon-bonded hydroxy group or hydrolysable group, preferably an oxime group, an alkoxy group, an acetoxy group or a lactate group, more preferably alkoxy group, in particular methoxy group.

In preferred embodiments, the polyorganosiloxanes have the general Formula (III)

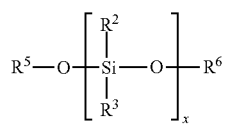

(III)

wherein

R⁵ and R⁶ are the same or different and independently selected from the group consisting of hydrogen, a substituted or unsubstituted hydrocarbon group having 1 to 22 carbon atoms, optionally interrupted by at least one heteroatom;

R² and R³ are the same or different and independently selected from a substituted or unsubstituted hydrocarbon group having 1 to 18 carbon atoms, optionally interrupted by at least one heteroatom; and x is an integer of at least 1, preferably in the range of from 1 to 2000, more preferably 10 to 1000.

In various embodiments, $R^5$ and $R^6$ are the same or different and independently selected from hydrogen, a substituted or unsubstituted $C_1$-$C_{12}$ alkyl group, $C_1$-$C_{12}$ alkenyl group, $C_3$-$C_{10}$ cycloalkyl, $C_6$-$C_{18}$ aralkyl group, and $C_6$-$C_{18}$ aryl group, optionally interrupted by at least one heteroatom, preferably O, N, S and/or Si. More preferably $R^5$ and $R^6$ are the same or different and independently selected from hydrogen, a substituted or unsubstituted $C_1$-$C_8$ alkyl group, in particular methyl, ethyl, n-propyl, fluoropropyl, n-butyl, sec-butyl, or tert-butyl, or a substituted or unsubstituted $C_6$-$C_{18}$ aryl group, in particular phenyl, tolyl or benzoyl.

In various embodiments, $R^2$ and $R^3$ are the same or different and independently selected from a substituted or unsubstituted $C_1$-$C_{12}$ alkyl group, $C_1$-$C_{12}$ alkenyl group, $C_3$-$C_{10}$ cycloalkyl, $C_6$-$C_{18}$ aralkyl group, $C_6$-$C_{18}$ aryl group, and $C_6$-$C_{18}$ alkaryl group, optionally interrupted by at least one heteroatom, preferably O, N, S and/or Si. More preferably $R^2$ and $R^3$ are the same or different and independently selected from a substituted or unsubstituted $C_1$-$C_8$ alkyl group, in particular methyl, ethyl, n-propyl, fluoropropyl, n-butyl, sec-butyl, or tert-butyl, $C_1$-$C_8$ alkenyl group, in particular vinyl, allyl, propenyl, or butenyl, $C_6$-$C_{18}$ aralkyl group, $C_6$-$C_{18}$ aryl group and $C_6$-$C_{18}$ alkaryl group, in particular phenyl, tolyl or benzoyl.

In preferred embodiments, $R^2$ and $R^3$ are the same or different and independently selected from methyl or phenyl. The starting materials for the condensation polymerization may comprise two or more organosiloxanes. In various embodiments, at least one of the organosiloxanes comprises one or more functional groups selected from vinyl, amine, alcohol, or nitro. Preferably at least 50% of $R^2$ and $R^3$ are alkyl groups having 1 to 6 carbon atoms and more preferably methyl groups, or phenyl groups, more preferable methyl groups. It is most preferred that substantially all $R^2$ and $R^3$ groups are methyl groups.

The linear organosiloxane has at least one hydroxy group or hydrolysable group, such as an oxime group, an alkoxy group, an acetoxy group or a lactate group, preferably alkoxy group, more preferably alkoxy group, in particular methoxy group, bound to a silicon atom. Preferably the organosiloxane has at least two silicon-bonded hydroxy groups or hydrolysable groups. It is preferred, in addition, that the hydroxy group(s) or silanol-forming hydrolysable group(s) are bound to terminal silicon atom(s).

The linear organosiloxane, which has at least one hydroxy group or silanol-forming hydrolysable group bound to a silicon atom, is preferably a diorganosiloxane.

Suitable linear organosiloxanes may have silicon-bonded hydroxy groups or hydrolysable groups which are in the polymer chain, but preferably these are present as terminal groups. Organosiloxanes having terminal silicon-bonded hydroxy groups are well known in the art. Suitable organosiloxanes include, but not limited to, α,ω-dihydroxy-terminated polydimethylsiloxanes, α,ω-dihydroxy-terminated polydiethylsiloxanes, α,ω-dihydroxy-terminated polydivinylsiloxanes, α,ω-dihydroxy-terminated polydiphenylsiloxanes, α,ω-dihydroxy-terminated polymethylethylsiloxanes, α,ω-dihydroxy-terminated polymethylvinylsiloxanes, α,ω-dihydroxy-terminated polymethylphenylsiloxanes, α,ω-dihydroxy-terminated polymethylchloromethylsiloxanes, α,ω-dihydroxy-terminated polymethylchloropropylsiloxanes, α,ω-dihydroxy-terminated polyethylvinylsiloxanes, α,ω-dihydroxy-terminated polyethylphenylsiloxanes, α,ω-dihydroxy-terminated polyvinylphenylsiloxanes, etc.

α,ω-dihydroxy-terminated polydimethylsiloxanes or α,ω-dihydroxy-terminated polymethylphenylsiloxanes are particularly preferred.

According to the present invention, polyorganosiloxanes are prepared using a basic initiator and a hydroxy group-containing compound in the presence of a polar aprotic solvent.

The basic initiator is selected from alkali metal hydroxides, alkali metal alcoholates, alkali metal silanolates, alkali earth metal hydroxides, alkali earth metal alcoholates, alkali earth metal silanolates, nitrogen containing bases, phosphazene bases, or N-heterocyclic carbenes, preferably nitrogen containing bases, wherein the solubility of the basic initiator in the polar aprotic solvent is higher than in the produced polyorganosiloxane.

In various embodiments, the phosphazene bases described in U.S. Pat. No. 6,054,548 and EP 1008611A1 can be used.

In preferred embodiments, the basic initiator is selected from nitrogen containing bases, more preferably selected from acyclic, bicyclic or monocyclic guanidines, bicyclic diguanidines, amines, amides, naphthyl derivatives, preferably 1,8-naphthyl diamines and 1,8-naphthyl bisguanidines.

Acyclic guanidines have the general formula (4)

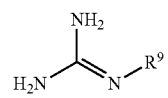

(4)

wherein $R^9$ is selected from the group consisting of hydrogen, a substituted or unsubstituted $C_1$-$C_{12}$ alkyl group and $C_6$-$C_{18}$ aryl group, optionally interrupted by at least one heteroatom, preferably nitrogen, oxygen and/or halogen.

In preferred embodiments, $R^9$ is selected from hydrogen, a substituted or unsubstituted $C_1$-$C_8$ alkyl group or $C_6$-$C_{12}$ aryl group, optionally interrupted by at least one heteroatom, preferably nitrogen, oxygen and/or halogen. Suitable alkyl groups include, but are not limited to, methyl, ethyl, propyl, butyl, pentyl, hexyl, octyl, isopropyl, and isobutyl. Suitable aryl groups may include, but are not limited to, phenyl, benzyl and naphthyl.

Monocyclic guanidines have the general formula (5)

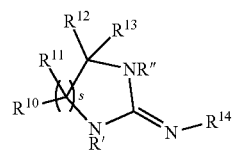

(5)

wherein $R^{10}$, $R^{11}$, $R^{12}$, $R^{13}$ are the same or different and independently selected from the group consisting of hydrogen, a substituted or unsubstituted $C_1$-$C_{12}$ alkyl group and $C_6$-$C_{18}$ aryl group, optionally interrupted by at least one heteroatom, preferably nitrogen, oxygen and/or halogen, or one or more of the $R^{10}$ to $R^{13}$ may be eliminated and replaced with a double bond between successive carbon atoms; $R^{14}$ is selected from a substituted or unsubstituted $C_1$-$C_{12}$ alkyl group and $C_6$-$C_{18}$ aryl group, optionally interrupted by at least one heteroatom, preferably nitrogen, oxygen and/or halogen; R' and R" are the same or different and independently selected from hydrogen, a substituted or unsubstituted $C_1$-$C_{12}$ alkyl group and $C_6$-$C_{18}$ aryl group, optionally interrupted by at least one heteroatom, preferably nitrogen, oxygen and/or halogen; and s is an integer in the range of from 1 to 5.

In preferred embodiments, $R^{10}$, $R^{11}$, $R^{12}$, $R^{13}$, R' and R" are the same or different and independently selected from hydrogen, a substituted or unsubstituted $C_1$-$C_8$ alkyl group or $C_6$-$C_{12}$ aryl group, optionally interrupted by at least one heteroatom, preferably nitrogen, oxygen and/or halogen; and/or $R^{14}$ is selected from a substituted or unsubstituted $C_1$-$C_8$ alkyl group or $C_6$-$C_{12}$ aryl group, optionally interrupted by at least one heteroatom, preferably nitrogen, oxygen and/or halogen. Suitable alkyl groups include, but are not limited to, methyl, ethyl, propyl, butyl, pentyl, hexyl, octyl, isopropyl, and isobutyl. Suitable aryl groups may include, but are not limited to, phenyl, benzyl and naphthyl.

Bicyclic guanidines have the general formula (6)

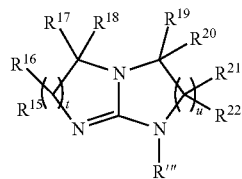

(6)

wherein $R^{15}$, $R^{16}$, $R^{17}$, $R^{18}$, $R^{19}$, $R^{20}$, $R^{21}$, $R^{22}$ are the same or different and independently selected from hydrogen, a substituted or unsubstituted $C_1$-$C_{12}$ alkyl group and $C_6$-$C_{18}$ aryl group, optionally interrupted by at least one heteroatom, preferably nitrogen, oxygen and/or halogen, or one or more of the $R^{15}$ to $R^{22}$ may be eliminated and replaced with a double bond between successive carbon atoms; R'" is selected from hydrogen, a substituted or unsubstituted $C_1$-$C_{12}$ alkyl group and $C_6$-$C_{18}$ aryl group, optionally interrupted by at least one heteroatom, preferably nitrogen, oxygen and/or halogen; and t and u are independently an integer in the range of from 1 to 5.

In preferred embodiments, $R^{15}$, $R^{16}$, $R^{17}$, $R^{18}$, $R^{19}$, $R^{20}$, $R^{21}$, $R^{22}$, R'" are the same or different and independently selected from hydrogen, a substituted or unsubstituted $C_1$-$C_8$ alkyl group or $C_6$-$C_{12}$ aryl group, optionally interrupted by at least one heteroatom, preferably nitrogen, oxygen and/or halogen. Suitable alkyl groups include, but are not limited to, methyl, ethyl, propyl, butyl, pentyl, hexyl, octyl, isopropyl, and isobutyl. Suitable aryl groups may include, but are not limited to, phenyl, benzyl and naphthyl.

In other preferred embodiments, bicyclic diguanidines which have the general formula (7) can be used

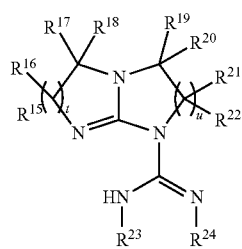

(7)

wherein $R^{15}$, $R^{16}$, $R^{17}$, $R^{18}$, $R^{19}$, $R^{20}$, $R^{21}$, $R^{22}$ and t and u have the same meanings as defined above; and $R^{23}$ and $R^{24}$ are the same or different and independently selected from a substituted or unsubstituted $C_1$-$C_{12}$ alkyl group, $C_3$-$C_{10}$ cycloalkyl group, and $C_6$-$C_{18}$ aryl group, optionally interrupted by at least one heteroatom, preferably nitrogen, oxygen and/or halogen.

In preferred embodiments, $R^{15}$, $R^{16}$, $R^{17}$, $R^{18}$, $R^{19}$, $R^{20}$, $R^{21}$, $R^{22}$ are the same or different and independently selected from hydrogen, a substituted or unsubstituted $C_1$-$C_8$ alkyl group or $C_6$-$C_{12}$ aryl group, optionally interrupted by at least one heteroatom, preferably nitrogen, oxygen and/or halogen; and/or $R^{23}$ and $R^{24}$ are the same or different and independently selected from hydrogen, a substituted or unsubstituted $C_1$-$C_8$ alkyl group or $C_6$-$C_{12}$ aryl group, optionally interrupted by at least one heteroatom, preferably nitrogen, oxygen and/or halogen. Suitable alkyl or cycloalkyl groups include, but are not limited to, methyl, ethyl, propyl, butyl, pentyl, hexyl, cyclohexyl, octyl, isopropyl and isobutyl. Suitable aromatic groups may include, but are not limited to, phenyl and benzyl.

Preferred bicyclic guanidines or bicyclic diguanidines include, but are not limited to, the following formulae (8) to (16):

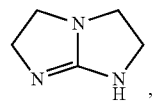

(8)

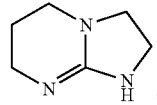

(9)

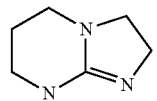

(10)

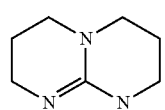

(11)

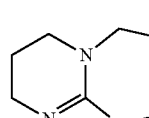

(12)

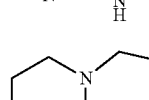

(13)

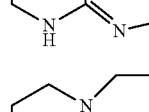

(14)

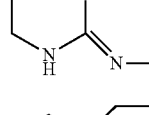

(15)

-continued

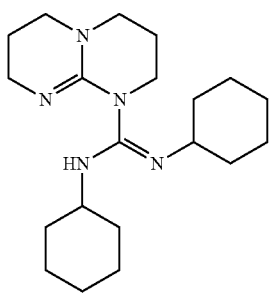
(16)

In alternatively preferred embodiments, bisguanidines having the general Formula (17) can be used.

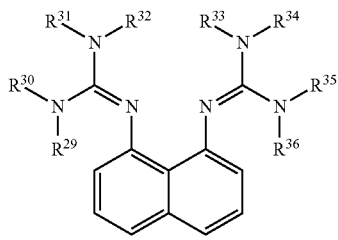
(17)

wherein $R^{29}$ to $R^{36}$ are the same or different an independently selected from a substituted or unsubstituted $C_1$-$C_{12}$ alkyl group and $C_6$-$C_{18}$ aryl group, optionally interrupted by at least one heteroatom, preferably nitrogen, oxygen and/or halogen. In preferred embodiments, $R^{29}$ to $R^{36}$ are the same or different and independently selected from a substituted or unsubstituted $C_1$-$C_8$ alkyl group or $C_6$-$C_{12}$ aryl group, optionally interrupted by at least one heteroatom, preferably nitrogen, oxygen and/or halogen. Suitable alkyl groups include, but are not limited to, methyl, ethyl, propyl, butyl, pentyl, hexyl, octyl, isopropyl, and isobutyl. Suitable aryl groups may include, but are not limited to, phenyl, benzyl and naphthyl.

Alternatively cyclic secondary or tertiary amines, preferably heterocyclic amines, for example compounds having a pyridine, pyrrolidine or pyrimidine ring, tertiary amines having an azabicyclo structure can be used. Suitable examples include, but are not limited to: N-methylpyrrolidine, sparteine 1,8-diazabicyclo[5.4.0]undec-7ene (DBU), 1,5-diazabicyclo[4.3.0]non-5-ene (DBN), 1,4-diazabicyclo[2.2.2]octane (DABCO), and 1,8-naphthyl diamine having the following general Formula (18)

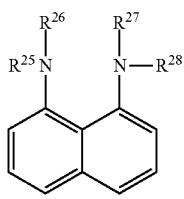
(18)

wherein $R^{25}$ to $R^{28}$ are the same or different and independently selected from a substituted or unsubstituted $C_1$-$C_{12}$ alkyl group and $C_6$-$C_{18}$ aryl group, optionally interrupted by at least one heteroatom, preferably nitrogen, oxygen and/or halogen. In preferred embodiments, $R^{29}$ to $R^{36}$ are the same or different and independently selected from a substituted or unsubstituted $C_1$-$C_8$ alkyl group or $C_6$-$C_{12}$ aryl group, optionally interrupted by at least one heteroatom, preferably nitrogen, oxygen and/or halogen. Suitable alkyl groups include, but are not limited to, methyl, ethyl, propyl, butyl, pentyl, hexyl, octyl, isopropyl, and isobutyl. Suitable aryl groups may include, but are not limited to, phenyl, benzyl and naphthyl.

1,5,7-Triazabicyclo[4.4.0]dec-5-ene (TBD), 1,8-bis(tetramethylguanidino)naphthalene or N,N'-dicyclohexyl-3,4,7,8-tetrahydro-2H-Pyrimido[1,2-a]pyrimidine-1(6H)-carboximidamide is particularly preferred.

The basic initiator is present in an amount from 0.05 mol % to 5000 mol % relative to the total amount of the cyclosiloxanes and the linear organosiloxanes. In particular, when cyclosiloxanes, such as cyclosiloxane having the general Formula (II), are used as the starting material, the basic initiator may be present in an amount of from 0.05 mol % to 5 mol %, preferably from 0.5 mol % to 3 mol % relative to the total amount of the cyclosiloxanes. When linear organosiloxanes having at least one silicon-bonded hydroxy group or hydrolysable group, such as linear organosiloxane having the general Formula (III), are used as the starting material, the basic initiator may be present in an amount of from 0.05 mol % to 5000 mol % relative to the total amount of the linear organosiloxanes.

In the first step of the reaction, the basic initiator reacts with a hydroxy group-containing compound in order to form highly active hydroxide ions, alkoxylate anions or silanolate anions which initiate the polymerization. The hydroxy group containing compound is preferably selected from the group consisting of water, alcohols, triorganosilanols, hydroxy terminated polymers, such as hydroxy terminated polystyrene, polyether polyols, polyester polyols, polycaprolactones, polybutadienes, polyisoprenes or poly(meth)acrylates, and mixtures thereof.

In preferred embodiments, the hydroxy group-containing compound is selected from the group consisting of water, a linear or branched alcohol having 1 to 22 carbon atoms, preferably 1 to 12 carbon atoms, and a triorganosilanol, and mixtures thereof.

In more preferred embodiments, the hydroxy group-containing compound is selected from a linear or branched alcohol having 1 to 22 carbon atoms, preferably 1 to 12 carbon atoms, in particular methanol.

The alcohol may have at least one reactive group, for example vinyl group, hydroxy, amino, halide.

The triorganosilanol has the general formula (19)

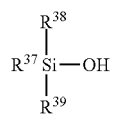
(19)

wherein $R^{37}$, $R^{38}$, $R^{39}$ are the same or different and independently selected from a substituted or unsubstituted hydrocarbon group having 1 to 18 carbon atoms, optionally interrupted by at least one heteroatom.

In various embodiments, $R^{37}$, $R^{38}$, $R^{39}$ are the same or different and independently selected from a substituted or unsubstituted $C_1$-$C_{12}$ alkyl group, $C_1$-$C_{12}$ alkenyl group, $C_3$-$C_{10}$ cycloalkyl, $C_6$-$C_{18}$ aralkyl group, $C_6$-$C_{18}$ aryl group, and $C_6$-$C_{18}$ alkaryl group, optionally interrupted by at least one heteroatom, preferably O, N, S and/or Si. More preferably $R^{37}$, $R^{38}$, $R^{39}$ are the same or different and independently selected from a substituted or unsubstituted $C_1$-$C_8$ alkyl group, in particular methyl, ethyl, n-propyl, fluoropropyl, n-butyl, sec-butyl, or tert-butyl, $C_1$-$C_8$ alkenyl group, in particular vinyl, allyl, propenyl, or butenyl, $C_6$-$C_{18}$ aralkyl group, $C_6$-$C_{18}$ aryl group and $C_6$-$C_{18}$ alkaryl group, in particular phenyl, tolyl or benzoyl.

In one embodiment, sufficient water as the hydroxy group-containing compound can be present for the ring-opening polymerization reaction and/or condensation polymerization simply by taking no special drying steps with the starting material or the used solvent. A hydroxy-terminated polyorganosiloxane can be obtained.

In one embodiment an alcohol is provided which can lead to an α,ω-dialkoxy-terminated polyorganosiloxane or a α-monoalkoxy-terminated polyorganosilanol. If a silanol is provided the terminating groups $R^1$ and $R^4$ in the general Formula (I) are defined by Si—$R^{37}R^{38}R^{39}$.

The hydroxy group-containing compound can act as co-initiator and terminating agent at the same time. Therefore, the usage of an additional terminating agent such as diorganotetramethyldisiloxanes may be used but it is not necessary.

The concentration of the hydroxy group-containing compound influences the molecular weight of the obtained polysiloxanes. Depending on the concentration of the hydroxy group-containing compound, polysiloxanes having a number average molecular weight in the range of from 1000 to 350,000 g/mol can be achieved.

According to the present invention, the polymerization is performed in a polar aprotic solvent, in which the polymer is not miscible at room temperature. This leads to a biphasic reaction system. In the context herein, the aprotic polar solvent is a solvent with a comparatively high relative permittivity (or dielectric constant), greater than about 15, and a sizable permanent dipole moment, that cannot donate suitably labile hydrogen atoms to form strong hydrogen bonds; and it is miscible in water.

Suitable polar aprotic solvents include, but not limited to: nitriles, preferably acetonitrile, disubstituted amides such as N-methyl-2-pyrrolidone (NMP) or dimethylformamide (DMF), and tetrasubstituted ureas such as 1,1,3,3-tetramethylurea, sulfoxides such as dimethyl sulfoxide (DMSO) or methyl dodecyl sulfoxide, or tetramethylene sulfone, nitro compounds such as nitromethane, 1,4-dioxane and mixtures thereof. Most preferably, nitriles, in particular acetonitrile, can be used as the polar aprotic solvent.

Basic solvents such as pyridines and protic solvents such as water, alcohols and carboxylic acids are not suitable since they can react either with the siloxane starting materials or with initiators.

The solubility of the basic initiator at room temperature in the polar solvent shall be higher than in the polymeric product—which is produced by the process according to the present invention—and preferably also higher than in the siloxane starting materials. This bears the advantage that under polymerization conditions, the initiator is not being encapsulated in the nascent polymer particles and the initiator does not need to diffuse out of those particles.

Due to the biphasic nature of the system, high conversion can be achieved and quenching of the reaction by deactivation of the initiator, for example by adding an acid or by bubbling carbon dioxide through the reaction mixture is not needed. After cooling down to room temperature the phases are simply separated. After isolation of the polymeric phase via simple phase separation, the obtained polysiloxane may be further purified by washing with water or methanol or by running it over a silica filled column and stripping at 80 to 120° C. in vacuum e.g. with a thin film evaporator.

Moreover, since most of the initiator remains in the polar phase (i.e., solvent phase) after the polymerization reaction, an additional neutralization of the polymeric product is not necessary. Furthermore, it allows recycling the initiator and the solvent for a subsequent polymerization. The solvent phase can be recycled by simple decantation and addition of new siloxane starting materials and co-initiator to the solvent phase. Therefore, the whole process is very economic and cost saving.

The polymerization reaction can be carried out at room temperature or under heating. Heating, for example at 40° C., or most preferably at 65° C. or higher, is appropriate to achieve a higher conversion. The heating temperature is limited by the boiling point of the selected solvent and of the selected initiator and the selected hydroxy group-containing compound. As the reaction mixture is a two-phase system, the reaction mixture is mixed vigorously to ensure homogenous dispersion of the two phases.

The polymerization reaction is generally performed under inert gas, e.g., nitrogen or argon, and with dry reactants to exclude any influence of moisture and atmospheric carbon dioxide. This is not essential for the success of the reaction but guarantees cleaner products and higher conversions.

The following will describe the present invention with reference to Examples and Comparative Examples, but the invention is not limited by these Examples and the like.

Methods:

Gel Permeation Chromatography (GPC)

The determination of the molecular weight of the polymers was performed via GPC. For the separation a combination of three different columns was used: Styragel HR 4 (300×7.8 mm), Styragel HR 3 (300×7.8 mm), precolumn Styragel (30 mm) obtained from Waters. As a detector a light scattering detector is used. As eluent toluene is used with a flow rate of 1 mL/min. As standard PDMS is used.

Conversion

The conversion of monomer is calculated via integration of the peak areas from $^{29}$Si-IG-NMR according to the following formula $$\text{conversion} = \frac{\int \text{Polymer} + \int \text{terminating group}}{\int D_4 + \int \text{Polymer} + \int \text{terminating group} + \int \text{by-products}} \cdot 100\%$$

Two spectrometers of the BRUKER Company were used for the nuclear magnetic resonance (NMR) measurements:

Bruker AV 400 (Year 2005): Magnetic field=9.4 T; Resonance frequency=400 MHz

Bruker AV 300 (Year 2005): Magnetic field=7.0 T; Resonance frequency=300 MHz

Samples were measured in analytical grade deuterated chloroform CDCl3 (≥99.8%)—sample concentration=0.5 g/0.5 mL—at 297.0 K with following parameters:

| Parameter | Bruker AV 300 | Bruker AV 400 |
|---|---|---|
| Pulse program | zgig30 | zgig30 |
| Number of Scans | 256 | 256 |
| Delay between scans | 20.0 s | 20.0 s |
| Spectrometer frequency | 59.6273883 MHz | 79.4945753 MHz |

EXAMPLE 1

1,5,7-Triazabicyclo[4.4.0]dec-5-ene (2.29 g), dry methanol (17 mL) and dry acetonitrile (375 mL) were taken into a round bottom three-neck flask fitted with reflux condenser and mechanical stirrer. Under vigorous stirring, octamethyltetracyclosiloxane (260 mL) is added to the reaction mixture. The reaction was kept in an oil bath maintained at 65° C. After 24 h of reaction the conversion was about 90% and $M_n$ of the polymer was 10000 g/mol.

EXAMPLE 2

1,5,7-Triazabicyclo[4.4.0]dec-5-ene (48 mg), dry methanol (14 μL) and dry acetonitrile (7.5 mL) were taken into a round bottom three-neck flask fitted with reflux condenser and mechanical stirrer. Under vigorous stirring, octamethyltetracyclosiloxane (5 g) is added to the reaction mixture. The reaction was kept in an oil bath maintained at 65° C. After 24 h of reaction the conversion was about 93% and $M_n$ of the polymer reached 126000.

EXAMPLE 3

1,5,7-Triazabicyclo[4.4.0]dec-5-ene (188 mg), dry methanol (5.5 mL) and dry acetonitrile (30 mL) were taken into a round bottom three-neck flask fitted with reflux condenser and mechanical stirrer. Under vigorous stirring, octamethyltetracyclosiloxane (20 g) is added to the reaction mixture. The reaction was kept in an oil bath maintained at 65° C. After 4 h of reaction the conversion was about 86%±10%.

EXAMPLE 4

1,5,7-Triazabicyclo[4.4.0]dec-5-ene (193 mg), water (12 mL) and dry acetonitrile (7.5 mL) were taken into a round bottom three-neck flask fitted with reflux condenser and mechanical stirrer. Under vigorous stirring, octamethyltetracyclosiloxane (20 g) is added to the reaction mixture. The reaction was kept in an oil bath maintained at 65° C. After 24 h of reaction the conversion was about 73% and $M_n$ of the polymer reached 3000 g/mol.

EXAMPLE 5

1,8-bis(tetramethylguanidino)naphthalene (239 mg), methanol (2.7 mL) and dry acetonitrile (15 mL) were taken into a round bottom three-neck flask fitted with reflux condenser and mechanical stirrer. Under vigorous stirring, octamethyltetracyclosiloxane (10 g) is added to the reaction mixture. The reaction was kept in an oil bath maintained at 65° C. After 24 h of reaction the conversion was about 89% and $M_n$ of the polymer reached 3000 g/mol.

EXAMPLE 6

1,8-Diazabicyclo[5.4.0]undecene (201 μL), methanol (5.5 mL) and dry acetonitrile (30 mL) were taken into a round bottom three-neck flask fitted with reflux condenser and mechanical stirrer. Under vigorous stirring, octamethylcyclotetrasiloxane (20 g) is added to the reaction mixture. The reaction was kept in an oil bath maintained at 65° C. After 24 h of reaction the conversion was about 79% and $M_n$ of the polymer reached 2700 g/mol.

EXAMPLE 7

A silanol-terminated poly(dimethylsiloxane) (10 g; $M_n$=3300 g/mol), 1,5,7-Triazabicyclo[4.4.0]dec-5-ene (200 mg) and acetonitrile (15 mL) were taken into a round bottom flask fitted with reflux condenser and magnetic stirrer. The reaction mixture was stirred vigorously and kept in an oil bath maintained at 65° C. After 4 h the $M_n$ of the polymer reached 86000 g/mol.

EXAMPLE 8

A silanol-terminated poly(dimethylsiloxane) (10 g; $M_n$=3300 g/mol), 1,5,7-Triazabicyclo[4.4.0]dec-5-ene (200 mg), methanol (490 μL) and acetonitrile (15 mL) were taken into a round bottom flask fitted with reflux condenser and magnetic stirrer. The reaction mixture was stirred vigorously and kept in an oil bath maintained at 65° C. After 24 h the $M_n$ of the polymer reached 21000 g/mol.

EXAMPLE 9

An α, ω-dimethoxypoly(dimethylsiloxane) (10 g; $M_n$=4000 g/mol), 1,5,7-Triazabicyclo[4.4.0]dec-5-ene (200 mg), $H_2O$ (220 μL) and acetonitrile (15 mL) were taken into a round bottom flask fitted with a reflux condenser and a magnetic stirrer. The reaction mixture was stirred vigorously and kept in an oil bath maintained at 65° C. After 4 h the $M_n$ of the polymer reached 32400 g/mol and after 24 h the $M_n$ of the polymer reached 44000 g/mol.

COMPARATIVE EXAMPLE 1

1,5,7-Triazabicyclo[4.4.0]dec-5-ene (94 mg), methanol (27.5 μL) were taken into a round bottom three-neck flask fitted with reflux condenser and magnetic stirrer. Under vigorous stirring, octamethylcyclotetrasiloxane (10 g) is added to the reaction mixture. The reaction was kept in an oil bath maintained at 65° C. After 24 h of reaction the conversion was about 63% and $M_n$ of the isolated polymer was 116000 g/mol.

COMPARATIVE EXAMPLE 2

1,5,7-Triazabicyclo[4.4.0]dec-5-ene (50 mg), methanol (13.6 μL) and dry toluene (7.5 mL) were taken into a round bottom two-neck flask fitted with reflux condenser and magnetic stirrer. Under vigorous stirring, octamethylcyclotetrasiloxane (5 g) is added to the reaction mixture. The reaction was kept in an oil bath maintained at 65° C. After 24 h of reaction the conversion was about 24% and $M_n$ of the isolated polymer was 20000 g/mol.

The invention claimed is:

1. A process for preparing polyorganosiloxanes, comprising:
   providing an initiator consisting of a nitrogen atom containing base that is not a phosphazene base;
   providing a hydroxy group-containing compound;
   providing a polar aprotic solvent; and
   (i) providing a linear organosiloxane which has at least one hydroxy group or hydrolysable group bound to a silicon atom and performing condensation polymerization of the linear organosiloxane with the initiator and the hydroxy group-containing compound in the presence of the polar aprotic solvent to form the polyorganosiloxanes; or
   (ii) providing a cyclosiloxane and performing ring-opening polymerization of the cyclosiloxane with the initiator and the hydroxy group-containing compound in the presence of the polar aprotic solvent to form the polyorganosiloxanes; or
   (iii) providing at least one linear organosiloxane which has at least one hydroxy group or hydrolysable group bound to a silicon atom, providing at least one cyclosiloxane, and performing ring-opening polymerization and condensation polymerization of the mixture of linear organosiloxane and cyclosiloxane with the initiator and the hydroxy group-containing compound in the presence of a polar aprotic solvent to form the polyorganosiloxanes;
   wherein the obtained polyorganosiloxanes are not miscible in the polar aprotic solvent at room temperature.

2. The process according to claim 1, wherein the polyorganosiloxanes have the general Formula (I)

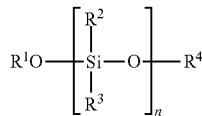

(I)

wherein
   $R^1$ and $R^4$ are the same or different and independently selected from the group consisting of hydrogen, a triorganosilyl group, and a substituted or unsubstituted hydrocarbon group having 1 to 22 carbon atoms, optionally interrupted by at least one heteroatom;
   $R^2$ and $R^3$ are the same or different and independently selected from a hydrocarbon group having 1 to 18 carbon atoms, optionally interrupted by at least one heteroatom; and
   n denotes an integer of at least 3.

3. The process according to claim 2, wherein:
   $R^1$ and $R^4$ are the same or different and independently selected from the group consisting of hydrogen, a triorganosilyl group, and a substituted or unsubstituted group selected from $C_1$-$C_{12}$ alkyl group, $C_1$-$C_{12}$ alkenyl group, $C_3$-$C_{10}$ cycloalkyl, $C_6$-$C_{18}$ aralkyl group, and $C_6$-$C_{18}$ aryl group, any of the groups optionally interrupted by at least one heteroatom; and/or
   $R^2$ and $R^3$ are the same or different and independently selected from a substituted or unsubstituted group selected from $C_1$-$C_{12}$ alkyl group, $C_1$-$C_{12}$ alkenyl group, $C_3$-$C_{10}$ cycloalkyl, $C_6$-$C_{18}$ aralkyl group, $C_6$-$C_{18}$ aryl group, and $C_6$-$C_{18}$ alkaryl group, any of the groups optionally interrupted by at least one heteroatom.

4. The process according to claim 1, wherein the cyclosiloxane has the general Formula (II)

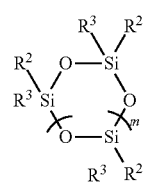

(II)

wherein
   $R^2$ and $R^3$ are the same or different and each independently selected from a hydrocarbon group having 1 to 18 carbon atoms, optionally interrupted by at least one heteroatom; and
   m denotes an integer in the range of from 1 to 10.

5. The process according to claim 4, wherein
   $R^2$ and $R^3$ are the same or different and independently selected from a substituted or unsubstituted group selected from $C_1$-$C_{12}$ alkyl group, $C_1$-$C_{12}$ alkenyl group, $C_3$-$C_{10}$ cycloalkyl, $C_6$-$C_{18}$ aralkyl group, $C_6$-$C_{18}$ aryl group, and $C_6$-$C_{18}$ alkaryl group, any of the groups optionally interrupted by at least one heteroatom; and/or
   m is 2 or 3.

6. The process according to claim 1, wherein the linear organosiloxane has the general formula

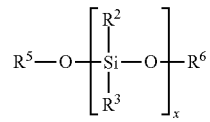

(III)

wherein
   $R^5$ and $R^6$ are the same or different and independently selected from the group consisting of hydrogen, a substituted or unsubstituted hydrocarbon group having 1 to 22 carbon atoms, optionally interrupted by at least one heteroatom;
   $R^2$ and $R^3$ are the same or different and independently selected from a substituted or unsubstituted hydrocarbon group having 1 to 18 carbon atoms, optionally interrupted by at least one heteroatom; and
   x is an integer of at least 1.

7. The process according to claim 6, wherein:
   $R^5$ and $R^6$ are the same or different and independently selected from hydrogen or a substituted or unsubstituted group selected from $C_1$-$C_{12}$ alkyl group, $C_1$-$C_{12}$ alkenyl group, $C_3$-$C_{10}$ cycloalkyl, $C_6$-$C_{18}$ aralkyl group, and $C_6$-$C_{18}$ aryl group, any of the groups optionally interrupted by at least one heteroatom; and/or
   $R^2$ and $R^3$ are the same or different and independently selected from a substituted or unsubstituted group selected from $C_1$-$C_{12}$ alkyl group, $C_1$-$C_{12}$ alkenyl group, $C_3$-$C_{10}$ cycloalkyl, $C_6$-$C_{18}$ aralkyl group, $C_6$-$C_{18}$ aryl group, and $C_6$-$C_{18}$ alkaryl group, any of the groups optionally interrupted by at least one heteroatom.

8. The process according to claim 1, wherein the step of providing a cyclosiloxane comprises providing two or more cyclosiloxanes and/or the step of providing a linear organosiloxane comprises providing two or more linear organosiloxanes.

9. The process according to claim 1, wherein the initiator is selected from phosphazene bases, N-heterocyclic carbenes; and solubility of the basic initiator in the polar aprotic solvent is higher than in the produced polyorganosiloxane.

10. The process according to claim 1, wherein the initiator is selected from acyclic, bicyclic or monocyclic guanidines, bicyclic diguanidines, amines, amides or naphthyl derivatives, 1,8-naphthyl diamines, 1,8-naphthyl bisguanidines, or mixtures thereof.

11. The process according to claim 1, wherein the initiator is selected from acyclic guanidines having the general Formula (4), monocyclic guanidines having the general Formula (5), bicyclic guanidines having the general Formula (6), bicyclic diguanidines having the general Formula (7), or 1,8-naphthyl bisguanidines having the general Formula (17):

wherein Formula (4) is

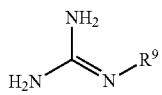

(4)

wherein $R^9$ is selected from the group consisting of hydrogen, a substituted or unsubstituted $C_1$-$C_{12}$ alkyl group and $C_6$-$C_{18}$ aryl group, optionally interrupted by at least one heteroatom;

wherein Formula (5) is

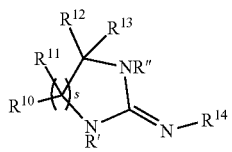

(5)

wherein $R^{10}$, $R^{11}$, $R^{12}$, $R^{13}$ are the same or different and independently selected from the hydrogen, a substituted or unsubstituted group selected from $C_1$-$C_{12}$ alkyl group and $C_6$-$C_{18}$ aryl group, any group optionally interrupted by at least one heteroatom; or one or more of the $R^{10}$ to $R^{13}$ may be eliminated and replaced with a double bond between successive carbon atoms;

$R^{14}$ is selected from a substituted or unsubstituted group selected from $C_1$-$C_{12}$ alkyl group and $C_6$-$C_{18}$ aryl group, any group optionally interrupted by at least one heteroatom;

R' and R" are the same or different and independently selected from hydrogen, a substituted or unsubstituted group selected from $C_1$-$C_{12}$ alkyl group and $C_6$-$C_{18}$ aryl group, any group optionally interrupted by at least one heteroatom; and s is an integer in the range of from 1 to 5;

wherein Formula (6) is

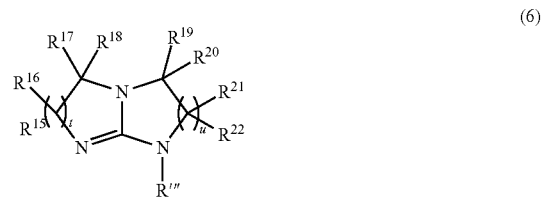

(6)

wherein $R^{15}$, $R^{16}$, $R^{17}$, $R^{18}$, $R^{19}$, $R^{20}$, $R^{21}$, $R^{22}$ are the same or different and independently selected from hydrogen, a substituted or unsubstituted group selected from $C_1$-$C_{12}$ alkyl group and $C_6$-$C_{18}$ aryl group, any group optionally interrupted by at least one heteroatom; or one or more of the $R^{15}$ to $R^{22}$ may be eliminated and replaced with a double bond between successive carbon atoms;

R''' is selected from hydrogen, a substituted or unsubstituted group selected from $C_1$-$C_{12}$ alkyl group and $C_6$-$C_{18}$ aryl group, any group optionally interrupted by at least one heteroatom; and t and u are independently an integer in the range of from 1 to 5;

wherein Formula (7) is

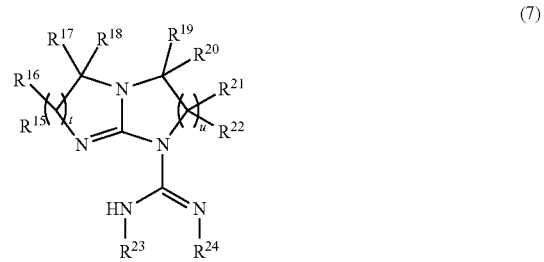

(7)

wherein $R^{15}$, $R^{16}$, $R^{17}$, $R^{18}$, $R^{19}$, $R^{20}$, $R^{21}$, $R^{22}$ and t and u have the same meanings as defined above; and $R^{23}$ and $R^{24}$ are the same or different and independently selected from a substituted or unsubstituted group selected from $C_1$-$C_{12}$ alkyl group, $C_3$-$C_{10}$ cycloalkyl group, and $C_6$-$C_{18}$ aryl group, any group optionally interrupted by at least one heteroatom;

wherein Formula (17) is

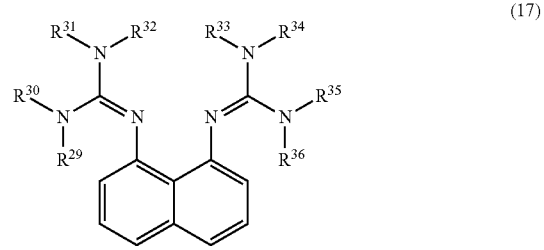

(17)

wherein $R^{29}$ to $R^{36}$ are the same or different and independently selected from a substituted or unsubstituted group selected from $C_1$-$C_{12}$ alkyl group and $C_6$-$C_{18}$ aryl group, any group optionally interrupted by at least one heteroatom.

12. The process according to claim 1, wherein the initiator is selected from cyclic secondary or tertiary amines; heterocyclic amines; compounds having a pyridine, pyrrolidine or pyrimidine ring; N-methylpyrrolidine or sparteine; tertiary amines having an azabicyclo structure; 1,8-diazabicyclo[5.4.0]undec-7ene (DBU); 1,5-diazabicyclo[4.3.0]non-5-ene (DBN); 1,4-diazabicyclo[2.2.2]octane (DABCO); or 1,8-naphthyl diamine having the following general Formula (18)

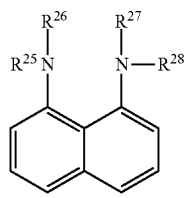

(18)

wherein $R^{25}$ to $R^{28}$ are the same or different and independently selected from a substituted or unsubstituted group selected from $C_1$-$C_{12}$ alkyl group and $C_6$-$C_{18}$ aryl group, any group optionally interrupted by at least one heteroatom.

13. The process according to claim 1, wherein the initiator is present in an amount from 0.05 mol % to 5000 mol % relative to the total amount of the cyclosiloxanes and the linear organosiloxanes.

14. The process according to claim 1, wherein the hydroxy group-containing compound is selected from the group consisting of water, a linear or branched alcohol having 1 to 22 carbon atoms, a linear or branched alcohol having 1 to 12 carbon atoms, a triorganosilanol, and mixtures thereof.

15. The process according to claim 1, wherein the polar aprotic solvent is selected from nitrile, acetonitrile, disubstituted amide, tetrasubstituted urea, sulfoxide, nitro compounds, or mixtures thereof.

* * * * *